US008271431B1

(12) United States Patent  (10) Patent No.: US 8,271,431 B1
Carrington  (45) Date of Patent: *Sep. 18, 2012

(54) METHOD AND SYSTEM FOR RETRIEVING AND SERVING REGULATORY HISTORY FOR A PROPERTY

(75) Inventor: Charles C. Carrington, Cocoa, FL (US)

(73) Assignee: Unearthed Land Technologies, LLC, Maitland, FL (US)

(*) Notice: Subject to any disclaimer, the term of this patent is extended or adjusted under 35 U.S.C. 154(b) by 216 days.

This patent is subject to a terminal disclaimer.

(21) Appl. No.: 12/434,489

(22) Filed: May 1, 2009

Related U.S. Application Data

(63) Continuation-in-part of application No. 12/252,413, filed on Oct. 16, 2008, now abandoned, and a continuation-in-part of application No. 12/419,112, filed on Apr. 6, 2009, and a continuation-in-part of application No. 11/945,988, filed on Nov. 27, 2007, and a continuation-in-part of application No. 11/073,578, filed on Mar. 8, 2005.

(51) Int. Cl.
*G06F 17/30* (2006.01)

(52) U.S. Cl. .............................. 707/603; 705/28; 705/39

(58) Field of Classification Search ........... 707/E17.008, 707/603; 705/26, 35, 39
See application file for complete search history.

(56) References Cited

U.S. PATENT DOCUMENTS

| | | | |
|---|---|---|---|
| 5,193,185 A | 3/1993 | Lanter | 707/101 |
| 5,680,305 A | 10/1997 | Apgar, IV | 705/10 |
| 6,148,289 A * | 11/2000 | Virdy | 705/1.1 |
| 6,522,875 B1 | 2/2003 | Dowling et al. | 455/414.3 |
| 6,636,803 B1 | 10/2003 | Hartz et al. | 701/208 |
| 6,766,322 B1 | 7/2004 | Bell | |
| 6,850,902 B1 * | 2/2005 | Finch | 705/28 |
| 2002/0013746 A1 | 1/2002 | Bibas et al. | |
| 2002/0103669 A1 | 8/2002 | Sullivan et al. | |
| 2002/0174090 A1 | 11/2002 | Dexter | 707/1 |
| 2003/0014342 A1 | 1/2003 | Vande Pol | 705/36 |
| 2003/0036922 A1 | 2/2003 | Fries | |
| 2003/0078897 A1 | 4/2003 | Florance et al. | 705/80 |
| 2003/0101072 A1 | 5/2003 | Dick et al. | |
| 2003/0131011 A1 * | 7/2003 | Haunschild et al. | 707/100 |
| 2003/0187756 A1 | 10/2003 | Klivington et al. | |
| 2003/0220807 A1 | 11/2003 | Hoffman et al. | |
| 2004/0039581 A1 | 2/2004 | Wheeler | |
| 2004/0059653 A1 | 3/2004 | Verkuylen et al. | |

(Continued)

OTHER PUBLICATIONS

Carrington, U.S. Appl. No. 11/073,578, filed Mar. 8, 2005.

(Continued)

*Primary Examiner* — Neveen Abel Jalil
*Assistant Examiner* — Jagdish Pandya
(74) *Attorney, Agent, or Firm* — Allen, Dyer, Doppelt, Milbrath & Gilchrist, P.A.

(57) ABSTRACT

Described is a method and system for retrieving and serving the regulatory history of a property. An identification of data sources for permits and approvals is stored in a computer system. Property identifiers from the data sources are stored in the computer system. The system identifies the types of permit and approval data available from each of the data sources for each of the property identifiers. A determination can be made of the completeness of the regulatory history available for each property associated with each of said property identifiers. The system receives a request for the regulatory history of at least one of the properties associated with the property identifiers. A web page is populated with a list of the regulatory history for the property.

10 Claims, 3 Drawing Sheets

U.S. PATENT DOCUMENTS

| | | |
|---|---|---|
| 2004/0117358 A1* | 6/2004 | von Kaenel et al. .............. 707/3 |
| 2004/0128313 A1 | 7/2004 | Whyman ...................... 707/103 |
| 2004/0220885 A1 | 11/2004 | Salzmann et al. |
| 2005/0010423 A1 | 1/2005 | Bagbey et al. |
| 2005/0071376 A1* | 3/2005 | Modi ........................ 707/104.1 |
| 2005/0091097 A1 | 4/2005 | De Sousa |
| 2005/0203768 A1 | 9/2005 | Florance et al. |
| 2005/0209867 A1 | 9/2005 | Diesch et al. |
| 2005/0209873 A1* | 9/2005 | Anastasi ........................... 705/1 |
| 2005/0262016 A1* | 11/2005 | Hill et al. ........................ 705/39 |
| 2005/0288955 A1 | 12/2005 | Lewiss-Hachmeister |
| 2006/0010005 A1 | 1/2006 | Rowland |
| 2006/0020518 A1 | 1/2006 | Lovison et al. |
| 2006/0020541 A1 | 1/2006 | Gommlich |
| 2006/0026136 A1 | 2/2006 | Drucker et al. |
| 2006/0064375 A1 | 3/2006 | Campagna et al. |
| 2006/0111945 A1 | 5/2006 | Tinsley et al. |
| 2006/0116952 A1 | 6/2006 | Orfano |
| 2006/0155559 A1 | 7/2006 | Richardson |
| 2006/0155571 A1 | 7/2006 | Almeida et al. |
| 2006/0253293 A1 | 11/2006 | Osborn |
| 2006/0294002 A1 | 12/2006 | Brett |
| 2007/0203730 A1 | 8/2007 | Firl et al. |
| 2007/0219818 A1 | 9/2007 | Duthler et al. |
| 2007/0255625 A1 | 11/2007 | Katzen |
| 2008/0059220 A1 | 3/2008 | Roth et al. |
| 2008/0082344 A1 | 4/2008 | Parker |
| 2008/0120243 A1 | 5/2008 | Lakin |
| 2008/0154686 A1 | 6/2008 | Vicino ............................... 705/8 |
| 2008/0167883 A1 | 7/2008 | Thavildar Khazaneh |
| 2008/0201209 A1 | 8/2008 | Grotto |
| 2008/0208707 A1 | 8/2008 | Erbey et al. |
| 2008/0222014 A1 | 9/2008 | Thompson et al. |
| 2008/0255871 A1 | 10/2008 | Wenzlau et al. |
| 2008/0281649 A1 | 11/2008 | Morris |
| 2008/0288336 A1 | 11/2008 | Charuk et al. |
| 2008/0306982 A1 | 12/2008 | Moudy |
| 2009/0077100 A1* | 3/2009 | Hancock et al. ................. 707/10 |
| 2009/0100031 A1* | 4/2009 | Gilligan et al. ................... 707/4 |

OTHER PUBLICATIONS

Carrington, U.S. Appl. No. 12/419,112, filed Apr. 6, 2009.
Carrington, U.S. Appl. No. 12/388,260, filed Feb. 18, 2009.
Carrington, U.S. Appl. No. 12/419,769, filed Apr. 7, 2009.
Carrington, U.S. Appl. No. 11/945,988, filed Nov. 27, 2007.
Carrington, U.S. Appl. No. 12/252,413, filed Oct. 16, 2008.
Carrington, U.S. Appl. No. 12/419,105, filed Apr. 6, 2009.
Carrington, U.S. Appl. No. 12/419,118, filed Apr. 6, 2009.
Carrington, U.S. Appl. No. 12/419,132, filed Apr. 6, 2009.
Carrington, U.S. Appl. No. 12/419,147, filed Apr. 6, 2009.
Carrington, U.S. Appl. No. 12/419,155, filed Apr. 6, 2009.
Carrington, U.S. Appl. No. 12/434,482, filed May 1, 2009.
Carrington, U.S. Appl. No. 12/266,340, filed Nov. 6, 2008.

* cited by examiner

METHOD AND SYSTEM FOR RETRIEVING AND SERVING REGULATORY HISTORY FOR A PROPERTY

This application is a continuation-in-part of U.S. patent application Ser. No. 12/252,413, filed Oct. 16, 2008, now abandoned U.S. patent application Ser. No. 12/419,112 filed Apr. 6, 2009, U.S. patent application Ser. No. 11/945,988 filed Nov. 27, 2007, and U.S. patent application Ser. No. 11/073,578 filed Mar. 8, 2005, the entire disclosures of which are incorporated herein by reference.

BACKGROUND OF THE RELATED ART

The regulatory history of a parcel of real property consists of past, present and future permits and approvals. Such future permits and approvals may be, e.g., permits and approvals necessitated or contemplated by new, proposed or anticipated legislation, regulations, laws, or other rules. Historically, governmental authorities provide citizens, corporations and other types of entities, non-governmental organizations and other governmental authorities access to the regulatory history of a parcel of real property via paper files.

Certain governmental authorities provide electronic access to portions of the regulatory history of property within the authority's jurisdiction. For example, in Florida, each county's property appraiser provides content to a county-specific database on which certain records connected with properties within the county are made available to the public.

In connection with real estate transactions, financing and development, parties perform regulatory due diligence which requires assembling the complete regulatory history of a property. Regulatory due diligence is typically performed by lawyers, engineers, land planners or other professionals. Liability considerations usually preclude assigning this work to assistants and clerical level personnel. The permits will certainly be reviewed by a professional and will be the subject of a final legal opinion or report. Overlooking a particular Permit or Approval could easily lead to an inaccurate and/or incomplete report and ultimately giving the wrong advice.

Currently, one has to travel the offices of each of the applicable governmental authorities and in many cases, such as a local government, the various departments thereof such as the planning, zoning, building, public works, environmental resources and other departments. (Other governmental authorities are subdivided into bureaus, sections, districts and the like.) At the reception desk for each, one has to request the file for the particular property and provide the particular means of identifying that particular property used by that governmental authority or department thereof. Sometimes it is necessary to wait for the first available staff member to assist you. Other times you are pointed in the direction of banks of filing cabinets and left to locate the desired file on your own. The governmental authority or department may have a system for organizing the files that is either unfamiliar or altogether a poor system. Files may be disorganized, misplaced or inexplicably missing. Missing files may be checked out to or in use without any tracking or other record by a staff member of the governmental authority or department thereof and must be located. Once the file (or more likely files) is located, it (they) must be reviewed for the desired permits and approvals. Items to be copied which are usually voluminous and often include plans, drawings or maps must be tabbed in some manner for copying by the first available clerical level employee of the governmental authority or department. Once copied, the governmental authority or department thereof collects for the copies. The process is repeated at the next governmental authority or department. Some governmental authorities or departments accept requests for copies of permits and approvals by letter and will process the request on an hourly rate basis, plus copy charges and shipping. Such governmental authorities have already or are in the process of scanning such paper files to convert them to a digital image that can be accessed electronically on the website of such governmental authority or department thereof by inputting the means of identifying such parcel of real property utilized by that particular governmental authority.

SUMMARY OF THE INVENTION

According to one embodiment, a method and system for retrieving and serving the regulatory history of a property are provided. An identification of data sources for permits and approvals is stored in a computer system. Property identifiers from the data sources are stored in the computer system. The system identifies the types of permit and approval data available from each of the data sources for each of the property identifiers. A determination is made of the completeness of the regulatory history available for each property associated with each of said property identifiers. The system receives a request for the regulatory history of at least one of the properties associated with the property identifiers. A web page is populated with a list of the regulatory history for the property.

In another embodiment, the system provides a data layering feature by which the computer layers the maps or other data, e.g., GIS data, of each of the respective governmental authorities. Utilizing the software, the computer automatically searches the particular means of identifying the property that has been input by the user. In another embodiment, utilizing the software, the computer recognizes the form of the means of identifying the property that has been input by the user and automatically retrieves data from the website or data source of the governmental authority with the corresponding form before searching the websites or data sources of the other governmental authorities. A match is found at, e.g., the website or data source of one of the applicable governmental authorities, and this match is used to identify the property. The data layering feature of the system enables the computer to automatically perform a layering of the maps or other data, e.g., GIS data, of other governmental authorities with the map or other data, e.g., GIS data, of such governmental authority identifying the particular property, resulting in the positive identification of the particular property for purposes of the websites or data sources of the other governmental authorities without regard to the means of identifying a particular property utilized by a particular governmental authority.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION

Figure 1:
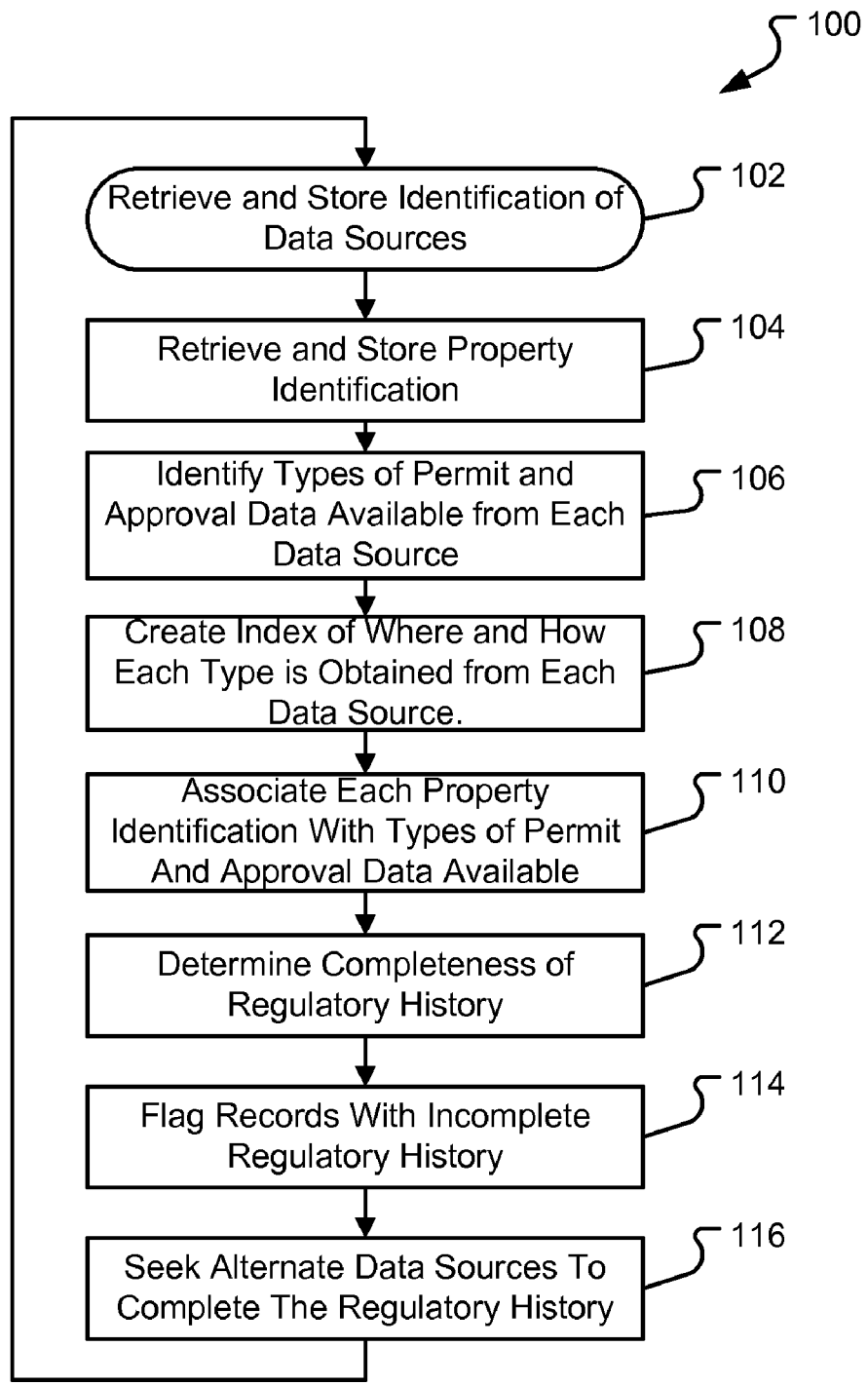
FIG. 1 shows a flowchart illustrating one embodiment of a method for operating a web crawler.

Reference will now be made in detail to embodiments of the present invention, examples of which are illustrated in the accompanying drawings.

In one embodiment, the invention provides a method and system for retrieving and serving regulatory history for a property. In certain embodiments the invention includes a step of storing the regulatory history. The regulatory history for a property includes past, present and future actions of federal, state, regional, agency, local and other governmental authorities and departments, districts, bureaus or other subdivisions thereof relating to activities involving commercial and residential real estate and improvements thereon, such as ownership, sale, purchase, transfer, exchange, leasing, financing, development, change in intensity of use or density, management, maintenance, permitting, assemblage, subdivision, redevelopment, clearing, filling, expansion, construction, reconstruction, building, remodeling, alteration, tenant finish, demolition, rehabilitation, drilling, mining, excavation, deposit (refuse, solid or liquid waste or fill), conservation, mitigation, protection, remediation, landscaping, alteration of a shore or bank (of a seacoast, river, stream, lake, pond or canal), waterscaping, architecture, design, planning, engineering and legal and all other manner of permits and approvals pertaining to the property, including permits, approvals, waivers, exceptions, exemptions, findings, determinations, hearings, or other official action(s) by any such governmental authority or subdivision thereof in connection with any of the foregoing activities, building permits, zoning permits, plat approvals, subdivision approvals, rezonings, comprehensive plans amendments, certifications, special exceptions, variances, development orders (granting, denying or granting with conditions an application for any of the foregoing), and any of the foregoing pertaining to concurrency, consistency, development of regional impact, future land use map amendments, comprehensive plan amendments, annexation, or sector planning.

Users of the system include owners, developers, buyers, sellers, landlords, tenants, brokers, realtors, law firms, land planning firms, engineering firms, environmental permitting firms, brokerage firms (sales and leasing), surveying firms, appraisal firms, real estate management firms, federal, state and local governmental authorities, as well as others having an interest in or otherwise dealing with real estate and related matters.

The system obtains and provides to the user for their review and analysis permits and approvals of federal, state, regional, agency, local and other governmental authorities relating to activities involving commercial and residential real estate such as ownership, sale, purchase, transfer, exchange, leasing, financing, development, management, maintenance, permitting, assemblage, redevelopment, expansion, construction, reconstruction, remodeling, tenant finish, demolition, rehabilitation, conservation, mitigation, protection, remediation, landscaping, waterscaping, architecture, design, planning, engineering and legal.

The method utilizes data available through the internet to access a complete regulatory history of permits and approvals for a particular property from websites or other data sources of governmental authorities or similar sources, such as local government websites, property appraisers' websites, clerks office websites, records retention websites, public library/record-keeping websites, zoning/land development regulation websites, and the like. A web crawler can be used to automatically populate a database of available permits and approvals for particular properties.

FIG. 1 shows a method 100 for operation of a web crawler in accordance with certain embodiments. The steps shown may be iteratively repeated on a regular basis, such as each night or continuously. At step 102, the URLs of websites that are known to contain permit or approval data are stored in a local database. As an alternative to URLs, other identifiers sufficient to determine the network location of the data sources may be stored. The web crawler may be programmed to use keyword searches to automatically search the internet for appropriate data sources and retrieve the identifiers, with or without human intervention. The data identifying relevant data sources may also be input as a file containing, for example, comma separated values, or in XML format. The data identifying relevant data sources is stored in a local database, which may reside on the same physical computer as the web crawler software or on a separate computer.

At step 104, property identifiers are stored in the local database. The property identifiers comprise data sufficient to uniquely identify one or more properties about which permit and approval data are available from one or more of the data sources. The property identifiers may include tax parcel numbers, metes and bounds legal descriptions, section land legal descriptions, GPS coordinates, property addresses, subdivision plat description, State, City, County, Street Address, Lot Number, permit number or date, approval number or date, other significant date, or others. The property identifiers may be automatically retrieved from the data sources identified in step 102 by the web crawler. Alternatively, the property identifiers may be input as a file containing, for example, comma separated values, or in XML format.

At step 106, the web crawler identifies the types of permit and approval data available for the identified properties from each identified data source. Permit and approval types include, e.g., permit, approval, waiver, exception, exemption, building permit, zoning permit, platt approval, subdivision approval, rezoning, certification, special exception, variance, development order. Human intervention may be used along with the web crawler to classify permit and approval data available from a particular data source into a particular type. The types of permit approval data available from a particular data source are stored in the local database.

At step 108, the data types identified at step 106 are used to create an index of where and how each data type can be found on each data source.

At step 110, the types of permit and approval data available for a particular property from the various data sources are associated in the local database with the property identifier for the property.

At step 112 a determination of the completeness of the regulatory history that is available from all data sources for a particular property is determined. In this step, the system can apply business rules to determine whether a complete regulatory history, sufficient to rely upon for purposes of due diligence, is available to the system for each property. Such business rules include, e.g., whether regulatory history was found at a particular governmental authority where pertinent regulatory history would be expected to be found for the property of interest. At step 114, records for individual properties for which the regulatory history is incomplete are flagged in the local database.

At step 116, the system seeks alternate data sources to complete the regulatory history. As with the initial step of retrieving and storing an identification of data sources at step 102, step 116 may be automated or involve manual input of the identification of alternate data sources.

Figure 2:
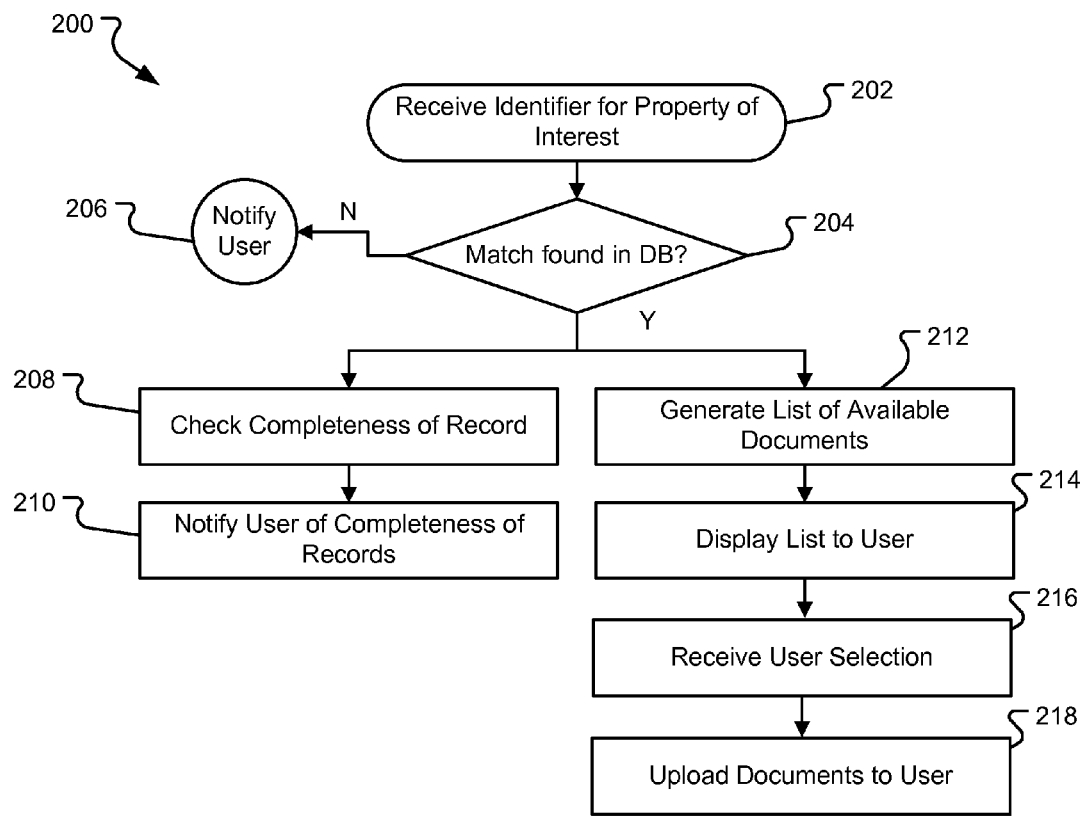
FIG. 2 shows a flowchart illustrating one embodiment of a method for receiving and serving requests from users.

FIG. 2 illustrates a method 200 by which the system assists a user in conducting regulatory due diligence once the web crawler has retrieved and stored data in accordance with FIG. 1. At step 202, the system receives from the user an identifier for a property of interest. The system may receive the information via a web interface to the user, by direct input of the identifier into the system by the user or others, via a private network, via the internet, or other known communication medium.

The identifier received from the user may be, e.g., one or more of: a tax parcel number, a metes and bounds legal description, a section land legal description, GPS coordinates, a property address, a subdivision plat description, a State, a City, a County, a Street Address, a Lot Number, or others. In an alternative embodiment, the system may receive all property identifiers for a particular property of interest.

At step 204, the system uses the identifier received from the user to identify one or more records in its local database for the specified property. As an alternative to consulting the local database, the system may go out to the data source and, using the identifier input by the user, retrieve property matches or possible matches, or additional property identifiers. The matching step 204 is preferably automatic, but could be performed manually. If a match is not found, the user is so notified at step 206. If multiple possible matches are found, the user may be prompted at this step to disambiguate between the matches. If a potential match is found, the user can be prompted to confirm the match. If below a certain predetermined threshold, the system would determine that there is a match. Otherwise, the system may alert the proprietor of the system to manually determine a match.

In layering maps or similar data from the governmental authorities, discrepancies may result in how the property is described by one governmental authority to the next arising from governmental authorities utilizing differing means to describe real property. The system may resolve any uncertainty in its matching process automatically as follows. The system using existing standard GIS techniques determines any discrepancies between how the property is described from one governmental authority to the next, reconciles and thereby determines a match. This process may also be utilized with the data layering feature described below. In another embodiment, the system includes software code for displaying a map showing states, counties, cities, and similar types of jurisdictional limits of governmental authorities of all types. In such embodiments, the system automatically performs an operation to determine the appropriate governmental authority for various purposes. For example, this operation would facilitate the identification of the appropriate governmental authority with jurisdiction over property taxes and the appropriate governmental authority with jurisdiction over permitting, which may be the same or different jurisdiction.

If step 204 results in a match being found in the local database, the completeness of the available records, which was determined previously at step 112 (FIG. 1), is checked and the user is notified of same at step 210.

At step 212, a list of available documents is generated. This step can be performed either online with the sources of available information or offline by referring to the local database. In online embodiments, the system uses the index created at step 101 (FIG. 1) to communicate with each of the sources of available information for the identified property and obtain from them lists of available documents for the property. Alternatively, in an offline embodiment, the system can refer to its local database to compile the list of all available documents for the property. At step 214, the list is displayed to the user.

At step 216, the system receives the user's selection of one or more documents to download. This selection may be a selection of all documents in the regulatory history of the property of interest. At step 218, the selected documents are uploaded to the user. In certain embodiments of the system, this step or previous steps will involve obtaining authorization from the user to charge a user's account or credit card for a fee for use of the system.

In certain embodiments, the system provides a data layering feature by which the computer automatically layers the maps or other data, e.g., GIS data, of each of the respective governmental authorities. Utilizing the software, the computer automatically searches the particular means of identifying the property that has been input by the user, such as a tax parcel number, metes and bounds legal description, section land legal description, GIS data, property address, subdivision plat description, GPS data, spatial data sets, spatial coordinates, unique I.D., centroid, cadastre, tabular data, attributes, non-spatial data, georeference data, etc., at each of the websites or data sources for the various governmental authorities until a match is found. In another embodiment, utilizing the software, the computer recognizes the form of the means of identifying the property that has been input by the user and automatically retrieves data from the website or data source of the governmental authority with the corresponding form before searching the websites or data sources of the other governmental authorities. For example, if the user inputted the tax parcel number for the particular property, utilizing the software, the computer would automatically run searches at the various governmental authorities for a match. In accordance with this example, a match is found at the applicable property appraiser's website. Utilizing the software, this match is used to identify the property. The data layering feature of the software enables the computer to automatically perform a layering of the maps or other data, e.g., GIS data, of other governmental authorities with the property appraiser's map or other data, e.g., GIS data, identifying the particular property resulting in the positive identification of the particular property for purposes of the websites or data sources of the other governmental authorities without regard to the means of identifying a particular property utilized by a particular governmental authority.

In one embodiment, utilizing the software, the computer retrieves and stores the particular means of identifying a property utilized by each governmental authority for later use in performing other operations. Having identified the particular property on each of the websites for each of the governmental authorities, the computer, utilizing the web crawler component of the invention, automatically performs searches of the websites of the various governmental authorities for the permits and approvals, as previously defined. Therefore, utilizing the means of identifying a particular property employed by any one of the applicable governmental authorities, the data layering feature of the software would automatically identify a particular property at the websites of all of the governmental authorities.

In one embodiment, utilizing the software, the computer searches for and retrieve all permits and approvals for a particular property utilizing the method above. In another embodiment, utilizing the software, the computer performs only such part of the foregoing operations as may be necessary to execute a custom search ordered by a user. For example, a user desiring only a particular approval of one governmental authority would place an order providing the one or more means of identifying the particular property at his disposal and inputting as a custom search the name of the particular permit or permits desired to be obtained. In another embodiment, utilizing the software and a user interface feature a user under a custom search would view the layering of the maps or similar data and utilizing certain commands move from the website of one governmental authority to that of another governmental authority to scan for and select desired permits and approvals and related information.

The system can be configured such that volume users have an established account or other contractual relationship with the proprietor of the system. Volume users may be offered volume discounts. Other prospective users will go inline to a web site associated with the system and complete a single transaction from time to time. Transactions may be priced on a flat fee basis, time to execute the transaction, kilobytes of data retrieved or similar bases of compensation.

Figure 3:
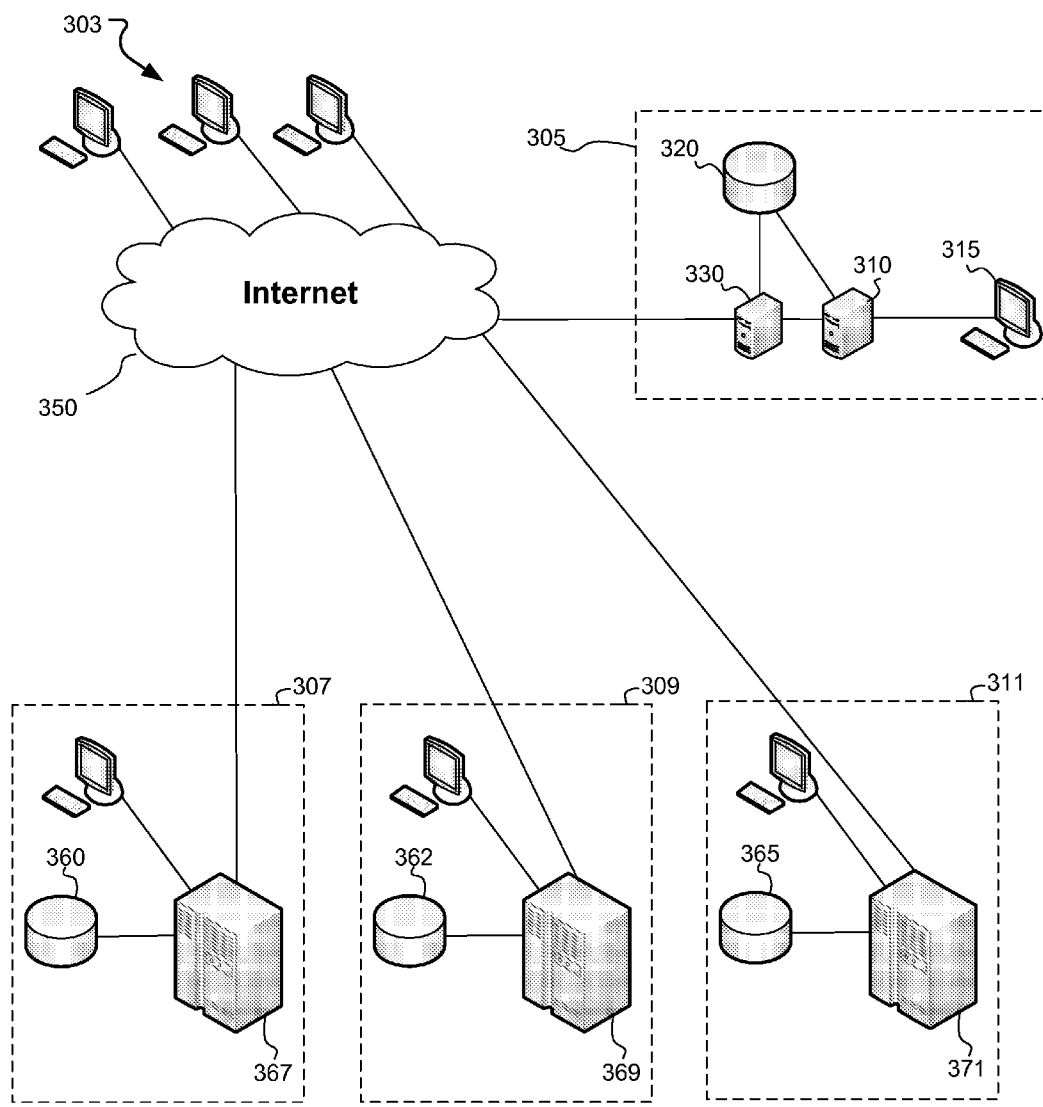
FIG. 3 shows a block diagram illustrating a system for practicing the methods of the invention.

FIG. 3 shows a block diagram of a system for carrying out the methods described above. A service provider 305 includes a web crawler 330 and a web server 310, which are accessed and controlled by one or more workstation computers 315. The web crawler 330 and the web server 310 both have access to a local database 320.

The web crawler 330 identifies and connects to a plurality of web servers 367, 369, 371 at data sources 307, 309, 311. The data sources 307, 309, 311 may be, e.g., government operated web sites. Each of the web servers 367, 369, 371 has access to a database 360, 362 and 365 wherein property records are stored. The web crawler queries the databases 360, 362, 365 via the web servers 367, 369, 371 to extract data and/or identify the URLs of the location of data or documents concerning particular properties. Of course, the data sources may be backend databases of governmental or non-governmental entities which are accessed directly by the system and not via a public-facing website. Such direct access can be provided by the database administrators, and such access may include access to fields and/or records in the database that are not accessible to the public via the public facing website.

In some embodiments, the system includes security measures to prevent hacking or other security concerns which may adversely affect a governmental authority or other data source. For example, firewall technologies can be utilized between the website or data source of the governmental authority and the system of the invention.

While the present invention has been particularly shown and described with respect to certain embodiments thereof, it should be readily apparent to those of ordinary skill in the art that various changes and modification in form and details may be made without departing from the spirit of the invention and the scope of the appended claims. It is intended that the present invention cover modifications and variations of this invention within the scope of the appended claims and their equivalents. The invention described is not limited to the various examples and embodiments in this document, but rather, it is intended that the individual claims point out and claim the invention.

What is claimed is:

1. A method of determining a land use based regulatory history comprising:
   crawling a plurality of remote computers over a communications network to build a local database, the plurality of remote computers being known to have land use based regulatory history data associated therewith;
   storing, in the local database, remote computer identifications associated with each of the plurality of remote computers;
   retrieving a plurality of real property identifiers from the plurality of remote computers over the communications network based upon the remote computer identifications, each of the plurality of real property identifiers having land use based regulatory history data associated therewith;
   searching the local database for a given real property based upon a given real property identifier associated therewith to determine which of the plurality of remote computers has land use based regulatory history data available for the given real property;
   determining whether the land use based regulatory history data available for the given real property is complete;
   retrieving land use based regulatory history data from another remote computer over the communications network based upon at least one of the retrieved plurality of real property identifiers when the land use based regulatory history data available for the given real property is not complete, wherein the another remote computer has a remote computer identification different from the remote computer identifications associated with each of the plurality of remote computers; and
   displaying the land use based regulatory history data for the given real property on a display.

2. The method according to claim 1, wherein the land use based regulatory history data available for the given real property is determined to be complete based upon at least one of a threshold amount of land use based regulatory history data and at least one of the remote computer identifications being from a predetermined one of the remote computers.

3. The method according to claim 1, wherein the land use based regulatory history data comprises at least one of permit history data and approval history data.

4. The method according to claim 1, wherein the land use based regulatory history data comprises types of the land use based regulatory history data; and wherein determining whether the land use based regulatory history data is complete comprises determining whether the types of land use based regulatory history data for the given real property are complete based upon a threshold amount of types of land use based regulatory history data.

5. The method according to claim 1, further comprising generating an index of the land use based regulatory history data and the plurality of real property identifiers.

6. The method according to claim 1, wherein displaying the land use based regulatory history data for the given real property on the display comprises displaying the land use based regulatory history data for the real given property on a webpage on the display.

7. The method according to claim 1, wherein the plurality of remote computers comprises a plurality of web servers.

8. The method according to claim 1, wherein the communications network comprises the Internet.

9. The method according to claim 1, further comprising overlaying on the display data layers of GIS data from each of the plurality of remote computers.

10. The method according to claim 1, wherein at least one of the plurality of remote computers comprises a governmental authority database.

* * * * *